Figure 1:
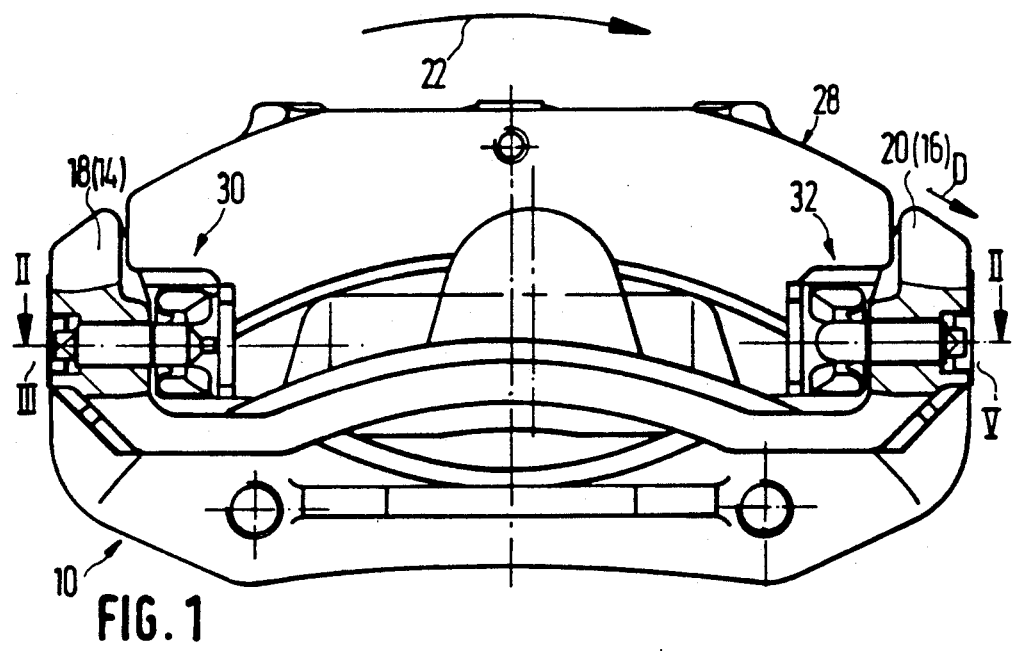

United States Patent [19]

Heibel

[11] Patent Number: 5,080,203
[45] Date of Patent: Jan. 14, 1992

[54] SPOT-TYPE DISC BRAKE HAVING A SLIDING CALIPER

[75] Inventor: Helmut Heibel, Moschheim, Fed. Rep. of Germany

[73] Assignee: Lucas Industries Public Limited Company, Birmingham, England

[21] Appl. No.: 525,670

[22] Filed: May 21, 1990

[30] Foreign Application Priority Data

Jun. 9, 1989 [DE] Fed. Rep. of Germany ... 8907101[U]

[51] Int. Cl.⁵ .............................................. F16D 65/12
[52] U.S. Cl. ................................ 188/73.43; 188/73.31
[58] Field of Search .................. 188/73.31, 73.32, 73.1,
188/73.39, 73.43, 73.44, 73.45, 73.42

[56] References Cited

U.S. PATENT DOCUMENTS

| | | | |
|---|---|---|---|
| 4,102,440 | 7/1978 | Wood | 188/73.1 |
| 4,211,310 | 7/1980 | Lupertz | 188/73.43 |
| 4,775,033 | 10/1988 | Heibel | 188/73.44 |

FOREIGN PATENT DOCUMENTS 0349195 8/1972 U.S.S.R. ............................ 188/73.45

Primary Examiner—Matthew C. Graham
Attorney, Agent, or Firm—Oblon, Spivak, McClelland, Maier & Neustadt

[57] ABSTRACT

In a spot-type disc brake guides are arranged between each of the arms of a brake support and the sliding caliper to permit displacement of the sliding caliper and the transmission of braking forces to the brake support. The guides each have a guide body comprising a groove extending in the direction of the axis of rotation of the brake disc as well as a projection engaging into said groove. To enable exceptionally high braking forces also to be transmitted by the caliper via the guides to the brake support, the groove and the projection of each guide, which upon braking in the operational direction of rotation of the brake disc is loaded with braking forces, have complementary circularly arcuate profiles in cross-section parallel to the brake disc.

7 Claims, 3 Drawing Sheets

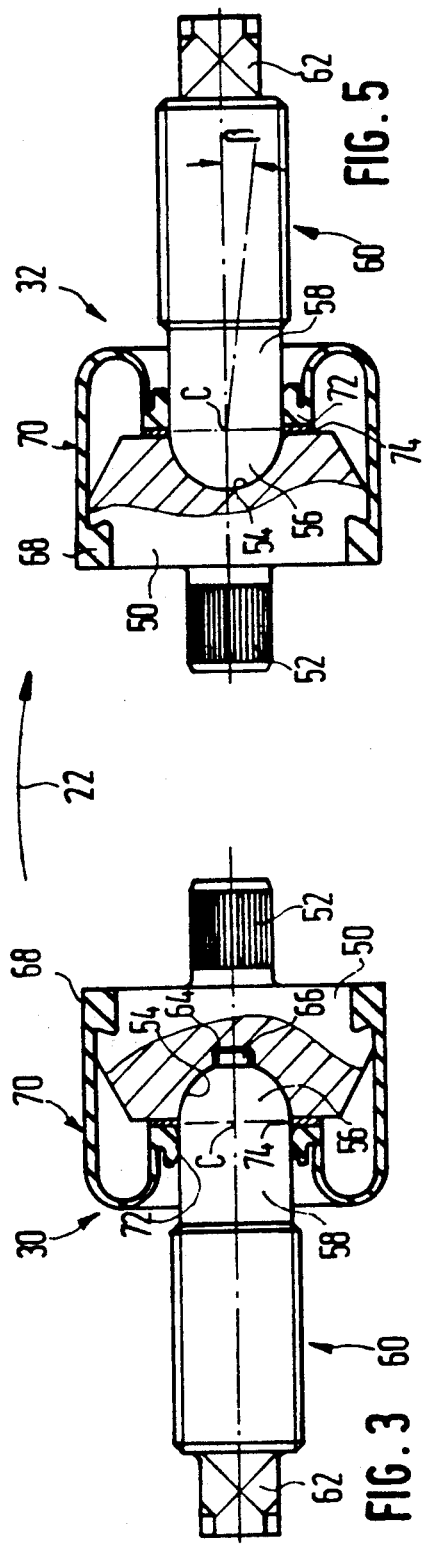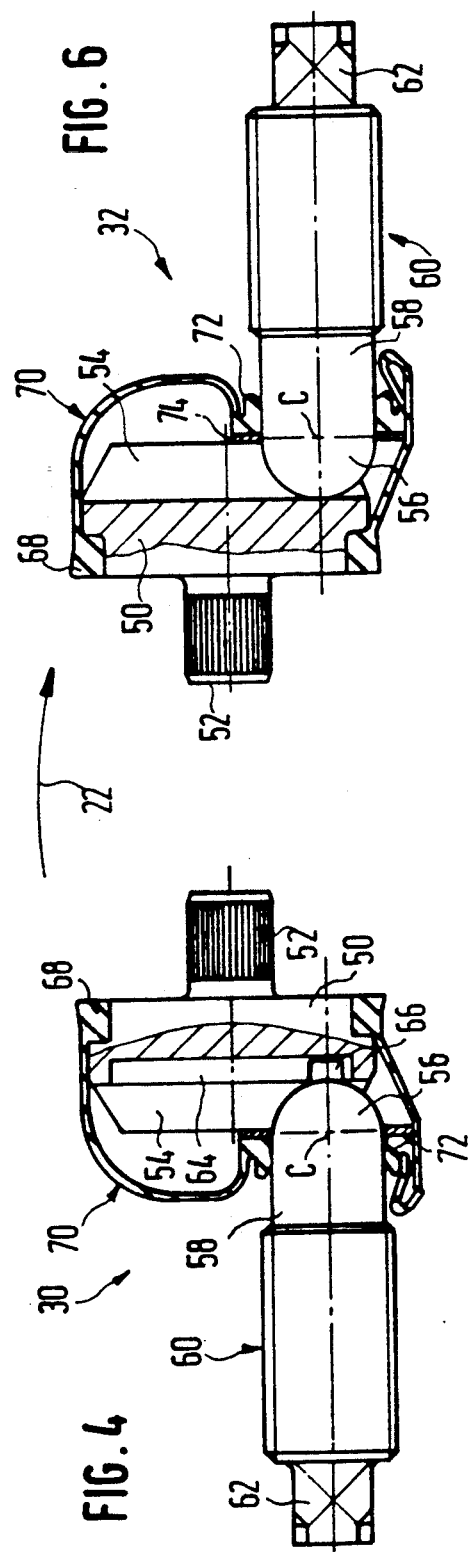

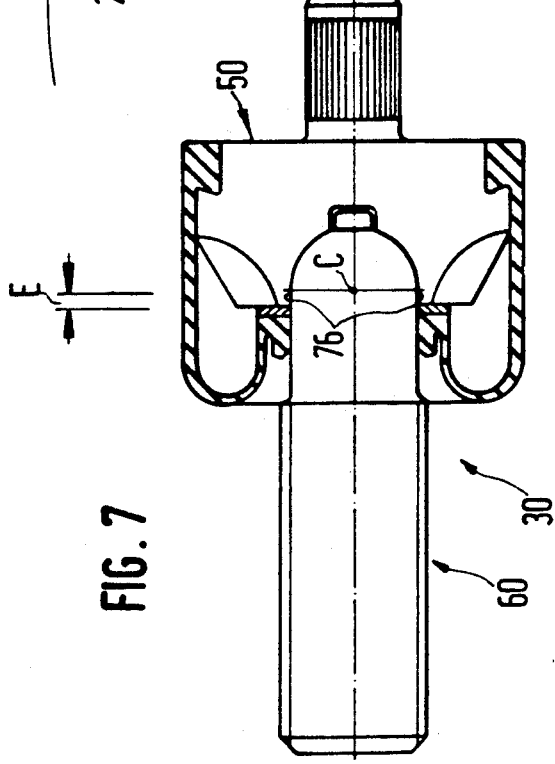

SPOT-TYPE DISC BRAKE HAVING A SLIDING CALIPER

The invention relates to a spot-type disc brake comprising a brake support having on at least one side of a brake disc a pair of arms offset with respect to each other in the direction of rotation of the brake disc, two brake pads to be applied to one side each of the brake disc, a sliding caliper straddling the brake disc as well as the two brake pads, an actuator arranged at one side of the brake disc on the sliding caliper to urge one of the brake pads directly against the brake disc and the other one by moving the sliding caliper, and guides which are each arranged between one arm and the sliding caliper to allow movement of the latter and to transmit braking forces onto the brake support, and which each comprise a guide body having a groove extending in the direction of the axis of rotation of the brake disc as well as a projection engaging into said groove.

EP 0229618 A (=U.S. Pat. No. 4,775,033 A) discloses a disc brake of this type in which the projections are formed by cylindrical pins and the grooves have a corresponding rectangular cross-section or the projections have a wedge-shaped profile and the grooves are correspondingly trapezoidal. The projections are formed at the ends of threaded pins which can thus be adjusted so that the sliding caliper is easily displaceable with small guide clearance.

The invention is based on the problem of further developing a spot-type disc brake of the type mentioned so that even extraordinary high braking forces can be transmitted by the caliper via the guides to the brake support without the guides being impaired thereby and without the arms of the brake support, on which the guides are formed or supported, having to be dimensioned unusually robust.

The problem is solved according to the invention in a spot-type disc brake of the aforementioned type in that the groove and projection of each guide, which upon braking in the normal direction of rotation of the brake disc is loaded by braking forces, have complementary circularly arcuate profiles in a cross-section parallel to the brake disc.

With the guides according to the invention the contact conditions between the complementary arcuate profiles do not change even when the braking force transmitted by the caliper via such a guide to the associated arm of the brake support is so large that the arm bends considerably within the limits defined by its elasticity. With known rectangular or trapezoidal guide profiles, in such a case locally excessive area pressures would occur or even tilting, which would promote wear of the guides and make movement of the sliding caliper difficult. In contrast, it is ensured with the configuration according to the invention, which relates at least to the guides loaded by braking forces, that the caliper can be moved easily enough even when loaded by high braking forces and the guides are not subjected to any greater wear than under moderate loads at which no arm of the brake support is subjected to appreciable bending.

In preferred embodiments of the invention the grooves and projections of all the guides have complementary circularly arcuate profiles. This gives the advantages described also for the case in which the brake is unusually forcefully actuated by way of exception when the brake disc is rotating against its operating direction of rotation, for example when reversing a vehicle equipped with such a brake. In addition, by as identical as possible configuration of all the guides manufacture of the brake can be made more economical. The circularly arcuate profile of the projections according to the invention can be achieved in particularly simple manner in that each of the projections is formed by a spherical segment at the end of a threaded pin engaging into the associated groove.

It is further expedient if the groove of at least one guide which is relieved of braking forces during braking in the operating direction of rotation of the brake disc has approximately parallel wall sections adjacent the semi-circular profile of the groove and guiding the associated projection even when it does not contact the semicircular profile of the associated groove because of elastic deformation of the brake support.

It is also advantageous if the groove of at least one guide which is relieved of braking forces during braking in the operating direction of rotation of the brake disc is deepened by a slot of limited axial length and the associated projection carries a pin extension which engages in the slot and limits the axial movability of the sliding caliper without participating in the transmission of braking forces.

Finally, it is of particular advantage if with each guide an elastic cup is associated which is sealingly secured with one of its ends to the associated guide body and is guided on a cylindrical shank carrying the associated projection with a sealing lip formed at its other end. Such sealing cups are present in the known brake described at the beginning. According to the invention they are further developed in that their sealing lip is stiffened at its end facing the associated groove by a metal ring fixedly connected thereto and is protected from becoming jammed in the groove.

Figure 2:
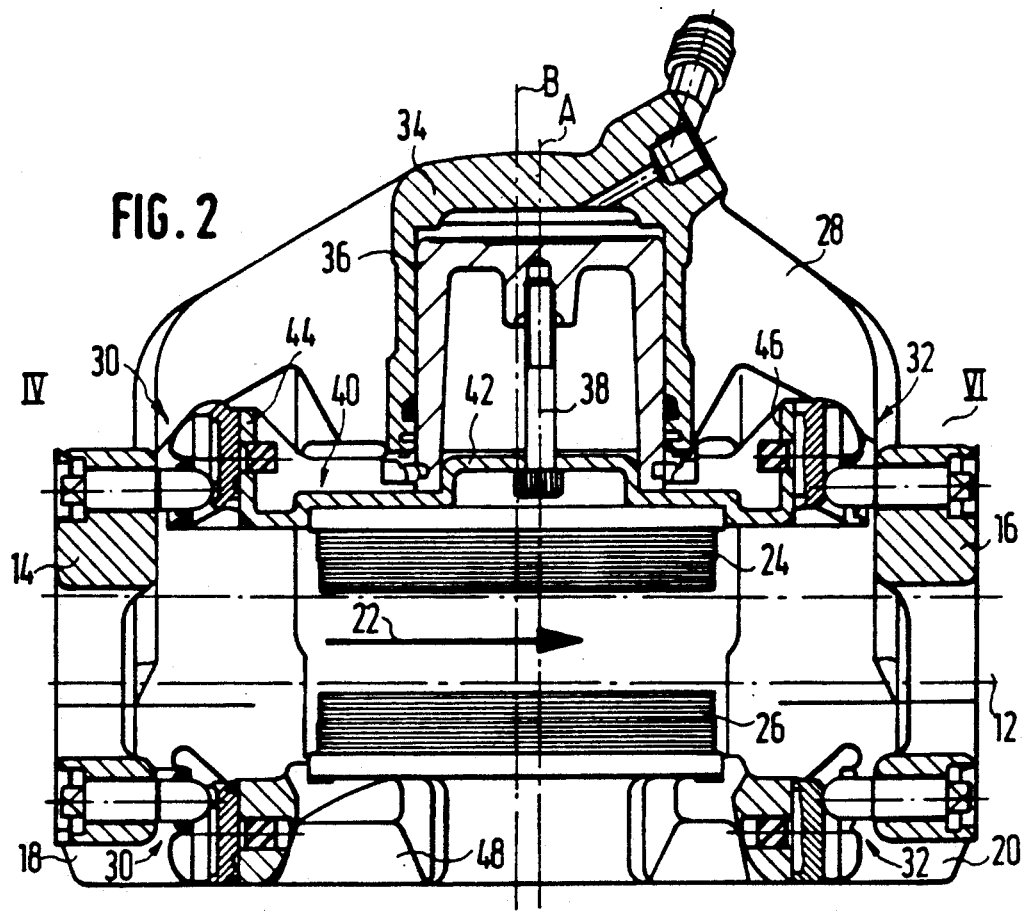

An example of embodiment of the invention will be explained with further details hereinafter with the aid of schematic drawings, wherein:

FIG. 1 is a side view of a spot-disc brake,
FIG. 2 is the section II—II of FIG. 1,
FIG. 3 is the fragment III of FIG. 1,
FIG. 4 is the corresponding fragment IV of FIG. 2,
FIG. 5 is the fragment V of FIG. 1,
FIG. 6 is the corresponding fragment VI in FIG. 2,
FIG. 7 is a modification of FIG. 3, and
FIG. is a modification of FIG. 5.

The disc brake illustrated has a brake support 10 of conventional design which on either side of a brake disc 12 indicated in dot-dash lines has a pair of arms 14 and 16 and 18 and 20. In the normal or operating direction of rotation of the brake disc 12 indicated by the arrow 22, the arms 14 and 18 are referred to as entrance-side arms and the arms 16 and 20 in contrast as exit-side arms.

A brake pad 24 and 26 respectively is arranged on either side of the brake disc 12. A sliding caliper 28 straddles said brake pads and the brake disc 12 and is guided at the arms 14 and 18 by means of an entrance-side guide 30 in each case and at the arms 16 and 20 by means of an exit-side guide 32 in each case. Integrally formed on the caliper 28 is a cylinder 34, the axis A of which is offset with respect to the plane B of symmetry of the brake pads 24 and 26 in the direction of rotation 22 of the brake disc 12 and which contains a piston 36.

Secured to the piston 36 by a screw 38 is a support plate 40 which comprises a dish 42 engaging into the piston 36 and centered therein and an entrance-side bent portion 44 and an exit-side bent portion 46. The brake pad 24 is supported on the plate 40 in such a manner that it can be applied by the piston 36 via the plate 40 directly to the brake disc 12. The other brake pad 26 is supported at a leg 48 of the sliding caliper 28. The sliding caliper 28 is guided on its side comprising the actuator 34 and 36 on the brake support 10 via the plate 40 by means of the associated guides 30 and 32. On the other side of the brake disc 12 the leg 48 of the sliding caliper 28 is guided directly on the brake support 10 by means of the guides 30 and 32 arranged there.

The two entrance-side guides 30 on either side of the brake disc 12 are completely identical; they are shown more exactly in FIGS. 3 and 4. They each have a guide body 50 comprising a pin 52 which is secured in the bent portion 44 of the plate 40 or in the leg 48 of the sliding caliper 28 in such a manner that the guide body extends parallel to the axis A and thus also to the axis of rotation of the brake disc 12. Worked into each guide body 50 is a groove 54 parallel to the axis A and having a semicircular cross-section.

Guided in the groove 54 is a projection 56 which has a complementary semicircular profile. In the example of embodiment illustrated this profile is formed in that the projection 56 is made hemispherical. The projection 56 is formed at the end of a cylindrical shank 58 which belongs to a threaded pin 60 screwed into the associated arm 14 or 18. The threaded pin 60 is arranged at right-angles to the plane B of symmetry and comprises an end portion 62 remote from the projection 56 having a square head or hexagonal socket or the like on which a tool can be placed for turning the threaded pin 60.

In accordance with FIGS. 3 and 4 the guide body 50 of the entrance-side guides 30 comprises at the bottom of its groove 54 a likewise axis-parallel slot 64 which does not extend over the entire length of the groove 54 and accommodates with play a small pin extension 66 extending away from the projection 56; as a result, the distance through which the sliding caliper 28 can be displaced with respect to the brake support 10 is restricted to the amount necessary for the operation of the brake and the sliding caliper 28 is prevented from becoming detached from the brake support 10 before installation of the brake.

To the guide body 50 a hook-like edge bead 68 of an elastic cup or sealing sleeve 70 is secured, at the other end of which a sealing lip 72 is formed. A stiff metal ring 74 is vulcanized onto the end face of the sealing lip 72 facing the groove 54. The hemispherical projection 56 is inserted through the sealing lip 72 and the metal ring 74 so that the sealing lip 72 is sealed with respect to the cylindrical shank 58 of the threaded pin 60. The metal ring 74 prevents the sealing lip 72 from contacting the guide body 50 directly and thereby being damaged.

The two exit-side guides 32 are shown more exactly in FIGS. 5 and 6. They correspond largely to the inlet-side guides 30; comparable parts are therefore given the same reference numerals in FIGS. 5 and 6 as in FIGS. 3 and 4. The differences are that in each of the exit-guides 32 the slot 64 in the guide body 50 and the pin 66 engaging into said slot are omitted. In each of the exit-side guides 32 the entire surface of the groove 54 of semicircular profile and the entire surface of the hemispherical projection 56 are thus available for transmitting braking forces.

Each of the threaded pins 60 can pivot on the associated guide body 50 in a relatively large range indicated by the angle β in FIG. 5 about the common profile centre point C of the groove 54 and of the projection 56 engaging therein without appreciably changing the contact conditions. It is thus not detrimental if the arms 16 and 20 on which the exit-side guides 32 are arranged are elastically bent by braking forces.

In FIG. 1 a bending of the arms 16 and 18, which may occur on strong braking, is indicated by an arrow D. The result of such a bending is that the profile centre point C of the exit-side grooves 54 and projections 56 as well as the profile centre points of the exit-side grooves 54 move away from the profile centre points of the entrance-side projections 56. Thus, at the entrance-side guides 30 a clearance can arise under strong braking. Such a clearance or play is however not detrimental as long as it does not exceed certain limits.

In FIG. 7 an entrance-side guide 30 is shown which is modified compared with that illustrated in FIGS. 3 and 4 in that the groove 54 in the guide body 50 has wall portions 76 which adjoin the semicircular groove profile and, extending from the latter, diverge slightly, for example at an angle of 5° to 10°. These wall portions have an axial length E of magnitude such that the projection 56 is guided without play between the wall portions 76 even when the sliding caliper 28, due to bending of the exit-side arms 16 and 20, has been moved in the direction of rotation 22 of the brake disc 12 through an amount E.

In FIG. 8 a modification of the exit-side guides 32 is shown which differs from FIGS. 5 and 6 in that the guide body 50 is divided into a support body 78 and a slide body 80 in which the groove 54 is formed. The slide body 80 consists of particularly slidable hard material, for example sintered metal, and is embedded in a rounded V-shaped groove 82 of the support body 78 in such a manner that between the support body 78 and slide body 80 only small Hertz area pressures arise even under extremely high loads on the brake.

I claim:

1. A spot-type disc brake comprising
   a brake support member (10) having on at least one side of a brake disc (12) a pair of arms (14, 16; 18, 20) offset with respect to each other in the direction of rotation (22) of the brake disc (12),
   two brake pads (24, 26) adapted to be applied to one side each of the brake disc (12),
   a sliding caliper member (28) straddling the brake disc (12) as well as the two brake pads (24, 26),
   an actuator (34, 36) arranged at one side of the brake disc (12) on the sliding caliper member (28) to urge one of the brake pads (24) directly against one side of the brake disc (12) and the other (26) pad against the other side of the brake disc by moving the sliding caliper member (28), and
   guides (30, 32) which are each arranged between one arm of the support member (14, 18; 16, 20) and the sliding caliper member (28) to allow movement of said caliper member and to transmit braking forces onto the brake support member (10), each guide comprising a guide body (50) having a groove (54) carried by one of said brake support and caliper members and extending in a direction parallel to the axis of rotation of the brake disc (12), and a pin carried by the other of said members and extending in a direction transverse to the disc axis, said pin including a projection (56) at one end engaging into said groove, characterized in that the groove (54) and the projection (56) of each guide (32), which upon braking in the normal direction of rotation (22) of the brake disc (12) is loaded by braking forces, having complementary circularly arcuate profiles when viewed in a plane parallel to the plane of the brake disc (12), each of the projections (56) being formed by a spherical segment at the end of its pin (60).

2. The spot-type disc brake as claimed in claim 1, characterized in that the groove (54) and the projections (56) of all the guides have complementary circularly arcuate profiles.

3. The spot-type disc brake as claimed in claim 2, characterized in that the groove (54) of at least one guide (30) which is relived of braking forces during braking in the normal direction of rotation (22) of the brake disc (12) has approximately parallel wall sections (76) adjacent the semi-circular profile of the groove (54) for guiding the associated projection (56) even when it does not contact the semicircular profile of the respective groove (54) because of elastic deformation of the brake support (10).

4. The spot-type disc brake as claimed in claim 2, characterized in that the groove (54) of at least one guide (30) which is relived of braking forces during braking in the normal direction of rotation (22) of the brake disc (12) is deepened by a slot (64) of limited axial length, and that the associated projection (56) carries a pin (66) which engages in the slot (64) and limits the axial movability of the sliding caliper (28) without participating in the transmission of braking forces.

5. The spot-type disc brake as claimed in claim 1, characterized in that with each guide (30, 32) an elastic cup (70) is associated which is sealingly secured with one of its ends (68) to the associated guide body (50) and is guided on a cylindrical shank (58) carrying the associated projection (56) with a sealing lip (72) formed at its other end and that the sealing lip (72) is stiffened at its end facing the associated groove (54) by a metal ring (74) fixedly connected thereto, the lip (72) being protected by the ring (74) from becoming jammed in the groove (54).

6. The spot-type disc brake as claimed in claim 1, wherein the guide body (50) is divided into a support body (78) and a slide body (80) of harder material than said support body (78) and in which the groove (54) is formed.

7. The spot-type disc brake as claimed in claim 6, wherein the support body (78) has a V-shaped groove (82) therein, the slide body (80) on the side thereof opposite the projection-receiving groove (54) being embedded in the V-shaped groove (82) of the support body (78).

* * * * *